(12) United States Patent
Paul et al.

(10) Patent No.: US 10,766,825 B2
(45) Date of Patent: Sep. 8, 2020

(54) SELF-DISPERSIBLE MIXTURE SILICON ADDITIVE COMPOSITION, ITS EMULSION AND ITS USE THEREOF

(71) Applicant: WACKER METROARK CHEMICALS PVT. LTD., Chandi, Parganas (South) (IN)

(72) Inventors: Amit Kumar Paul, West Bengal (IN); Abhijit Tarafdar, West Bengal (IN)

(73) Assignee: WACKER METROARK CHEMICALS PVT. LTD., West Bengal (IN)

( * ) Notice: Subject to any disclaimer, the term of this patent is extended or adjusted under 35 U.S.C. 154(b) by 0 days.

(21) Appl. No.: 15/767,682

(22) PCT Filed: Oct. 12, 2016

(86) PCT No.: PCT/IB2016/056091
§ 371 (c)(1),
(2) Date: Apr. 12, 2018

(87) PCT Pub. No.: WO2017/064624
PCT Pub. Date: Apr. 20, 2017

(65) Prior Publication Data
US 2018/0282234 A1 Oct. 4, 2018

(30) Foreign Application Priority Data
Oct. 12, 2015 (IN) .......................... 1076/KOL/2015

(51) Int. Cl.
| | | |
|---|---|---|
| *C04B 40/00* | (2006.01) | |
| *C04B 28/04* | (2006.01) | |
| *C04B 24/32* | (2006.01) | |
| *C04B 24/42* | (2006.01) | |
| *C04B 111/27* | (2006.01) | |
| *C04B 103/40* | (2006.01) | |

(52) U.S. Cl.
CPC .......... *C04B 40/0042* (2013.01); *C04B 24/32* (2013.01); *C04B 24/42* (2013.01); *C04B 28/04* (2013.01); *C04B 40/0039* (2013.01); *C04B 2103/406* (2013.01); *C04B 2111/27* (2013.01)

(58) Field of Classification Search
None
See application file for complete search history.

(56) References Cited

U.S. PATENT DOCUMENTS

| | | | |
|---|---|---|---|
| 4,648,904 A | | 3/1987 | DePasquale et al. |
| 4,990,377 A | * | 2/1991 | Wilson ................ C04B 41/4922 106/2 |
| RE33,759 E | | 12/1991 | DePasquale et al. |
| 5,449,712 A | * | 9/1995 | Gierke ................ C04B 41/4961 106/2 |
| 5,552,476 A | * | 9/1996 | Halling ................... C03C 17/30 524/837 |
| 5,714,532 A | * | 2/1998 | Osterholtz ........... C08K 5/5435 524/114 |
| 2011/0201727 A1 | | 8/2011 | Hashemzadeh et al. |

FOREIGN PATENT DOCUMENTS

| | | |
|---|---|---|
| AU | 679141 B2 | 6/1997 |
| WO | 2008/062018 A1 | 5/2008 |
| WO | 2010/108781 A1 | 9/2010 |
| WO | 2011/087829 A1 | 7/2011 |
| WO | 2013/166280 A1 | 11/2013 |

OTHER PUBLICATIONS

Int'l Search Report and Written Opinion from Int'l Appln. No. PCT/IB2016/056091, dated Jan. 24, 2017.

* cited by examiner

*Primary Examiner* — Patricia L. Hailey
*Assistant Examiner* — Stefanie J Cohen
(74) *Attorney, Agent, or Firm* — Merchant & Gould P.C.

(57) ABSTRACT

A composition comprising a self-dispersible mixture additive composition comprising a alkylalkoxysilane of formula $(RO)_{4-n}SiR'_n$, or its hydrolysate or mixture thereof, where, R is same or different $C_1$-$C_{20}$, R' is same or different $C_1$-$C_{20}$; mixture of non-ionic emulsifier of HLB value between 8 and 20. The self-dispersible mixture additive composition is obtained by mixing the alkyltrialkoxysilane with a mixture of non-ionic emulsifier. The emulsion of the self-dispersible mixture additive composition is formed by mixing appropriate amount of an aqueous solvent to the self-dispersible mixture additive composition, and addition of thus formed emulsion to a porous product preferably dry cement to render uniform and long lasting hydrophobic property of the final product made of the porous product.

9 Claims, No Drawings

SELF-DISPERSIBLE MIXTURE SILICON ADDITIVE COMPOSITION, ITS EMULSION AND ITS USE THEREOF

This application is a National Stage Application of PCT/IB2016/056091, filed 12 Oct. 2016, which claims benefit of Serial No. 1076/KOL/2015, filed 12 Oct. 2015 in India and which applications are incorporated herein by reference. To the extent appropriate, a claim of priority is made to each of the above disclosed applications.

FIELD OF INVENTION

The present invention relates to a self-dispersible mixture additive composition, an emulsion of the self-dispersible mixture additive composition and either coating the emulsion or addition of the emulsion or the self-dispersible mixture additive composition to a porous product preferably dry cement to render uniform and long lasting hydrophobic property.

BACKGROUND OF THE INVENTION

Organosilicon compounds, such as for example silanes or siloxanes, are frequently used in polymer compositions as water repellants. There are available additive material in the prior art which when added to the dry cement will impart the hydrophobic property.

There are prior art which describe additive compositions in the form of emulsion.

U.S. Pat. No. 4,648,904 reissued as U.S. RE33759 (hereinafter referred to as 759'): 759' discloses an aqueous emulsion of (a) a hydrolyzable silane. The composition in the prior art is in the form of emulsion which leads to a drastic reduction in the hydrophobicity property.

WO2011087829A1 describes aqueous emulsions of certain alkylalkoxysilanes and cationic alkoxysilanes that provide water proofing properties to a variety of substances, and in particular to masonry or concrete surfaces.

There are many issues with the prior art additive composition, e.g. the additive composition in the form of emulsion, the reactive alkoxy group present in the silane molecule reacts with each other in presence of water and forms a cross linked structure and thus becomes unreactive overtime. Hence the reactivity with the silicate molecule of the cement deteriorates, thus do not render proper hydrophobicity.

US20110201727A1 describes additive composition in the form of liquid or solid which is obtained by silane modified additives obtained by condensation of one or a plurality of silanes. But condensing silanes by mixing with an aqueous solvent in the presence of water-soluble polymers will have similar issue of losing the reactive alkoxy sites in the silane molecule. Thus, decreasing the final hydrophobic property of the material in which it is added.

There are prior art that the additive composition in the form of granulated hydrophobing additive. WO 2008/062018 describes a process for preparing a granulated hydrophobing additive for cementitious material in which an organosilicon component and a binder polymer are applied to a particulate carrier from aqueous emulsion.

WO2013166280A1 describes a process for increasing the hydrophobicity of a porous product by treating the product, or a composition providing for the product, with a water repellent material, characterized in that the porous product or a composition providing the product, is treated with an aqueous suspension of microcapsules where the microcapsules comprise a water repellent organosilicon core material selected from an organosilane, a partially condensed organosilane and a branched siloxane resin, and a shell of a silicon-based network polymer comprising silica units.

The granular hydrophobing additive when added to the cement forms a dry cementitious powder mixture, and when water is added to the dry cementitious powder mixture the active silane slowly get released but in the meantime due to the presence of water the active sites of cement start reacting with each other thus inhibiting proper attachment of active site of silane molecule with the active site of cement. Thus due to this issue, the hydrophobicity is not properly and uniformly achieved in the final product.

All the compositions known in the art which are in the emulsion form deteriorate over time on storage.

Thus there is a need of a proper solution that will impart proper hydrophobicity to the porous material when used as an additive composition and to provide compositions containing organosilicon compounds in a storage-stable form.

The present inventors have surprisingly found certain combinations of alkylalkoxysilanes and non-ionic emulsifier that self-disperse into water to form an emulsion without the need to use co-surfactants, nor any type of energy intense emulsifying equipment. The present emulsions provide water proofing properties to a variety of substances, and in particular to masonry or concrete surfaces, without requiring the addition of cure catalysts, the cure catalyst may be required for other applications like coating or film formation.

OBJECT OF THE PRESENT INVENTION

It is an object to provide a self-dispersible mixture additive composition which is storage-stable and has high silane content.

It is another object of the invention to provide a self-dispersible mixture additive composition which is obtained by mixing the alkyltrialkoxysilane with a mixture of non-ionic emulsifier.

It is yet another object of the present invention to provide long lasting hydrophobic property to a porous product comprising self-dispersible mixture additive composition.

SUMMARY OF THE PRESENT INVENTION

According to an aspect of the present invention there is provided a composition comprising:
a self-dispersible mixture additive composition comprising:
a alkyltrialkoxysilane of formula (I) or its hydrolysate or mixture thereof $$(RO)_{4-n}SiR'_n \qquad (I)$$

where, n is any number from 1 to 3,
R is same or different $C_1$-$C_{20}$ group,
R' is same or different $C_1$-$C_{20}$ group; and
one or more non-ionic emulsifier of HLB value between 8 and 20 and its mixtures thereof.

According to another aspect of the invention, there is provided a process of preparing a self-dispersible mixture additive composition, comprising:
combining (A) an alkylalkoxy silane of formula (I) or its hydrolysate or mixture thereof $$(RO)_{4-n}SiR'_n \qquad (I)$$

where, n is any number from 1 to 3,
R is same or different $C_1$-$C_{20}$,
R' is same or different $C_1$-$C_{20}$; and
(B) one or more non-ionic emulsifier of HLB value between 8 and 20 and its mixtures thereof.

According to another aspect of invention there is provided an emulsion comprising the self-dispersible mixture additive composition and a protic solvent.

According to another aspect of invention there is provided a powder composition comprising the self-dispersible mixture additive composition and a protic solvent.

According to another aspect of invention there is provided a liquid composition comprising the self-dispersible mixture additive composition and a protic solvent.

DETAILED DESCRIPTION OF THE PRESENT INVENTION

The present invention relates to a self-dispersible mixture additive composition which is obtained by mixing the alkyltrialkoxysilane with a mixture of non-ionic emulsifier of HLB value between 8 and 20. The emulsion of the self-dispersible mixture additive composition is formed by mixing appropriate amount of an aqueous solvent to the self-dispersible mixture additive composition. The additive thus formed is added as an emulsion to a porous product preferably dry cement to render uniform and long lasting hydrophobic property to the final product made of the porous product.

According to an embodiment of present invention, a stable composition is provided comprising a self-dispersible mixture additive composition comprising non-ionic emulsifier and silane which provides hydrophobicity. In the composition non-ionic emulsifier contributes to disperse the silane and makes the composition hydrophobic. Thus both the components silane and emulsifier acts synergistically to provide the desired hydrophobicity. This invention is a stable composition whose property do not deteriorate over time as we see in the prior art emulsion composition.

In accordance with the invention, a composition comprising a self-dispersible mixture additive is provided comprising:

a alkyltrialkoxysilane of formula (I) or its hydrolysate or mixture thereof

(RO)$_{4-n}$SiR'$_n$        (I)

where, R is same or different C$_1$-C$_{20}$,
R' is same or different C$_1$-C$_{20}$;
where, n is any number from 1 to 3,
mixture of non-ionic emulsifier of HLB value between 8 and 20.

In one of the embodiment the self-dispersible mixture additive composition is preferably without water.

In one of the embodiment, the alkylalkoxy silane or its hydrolysate or mixture thereof is from 1 to 99 weight percent of the composition, and preferably from 50 to 90 weight percent of the composition In one of the embodiments, the non-ionic emulsifier or its mixture is from 99 to 1 weight percent of the composition, preferably from 50 to 10 weight percent of the composition.

In an embodiment of the invention, the alkyltrialkoxysilane is selected from propyltrimethoxy silane, propyltriethoxy silane, octyltrimethoxy silane, octyltriethoxy silane, isooctyltrimethoxy silane, isooctyltriethoxy silane or its mixtures thereof.

Examples of hydrocarbons R, R' are alkyl radicals, such as the methyl, ethyl, n-propyl, isopropyl, 1-n-butyl, 2-n-butyl, isobutyl, tert-butyl, n-pentyl, isopentyl, neopentyl and tert-pentyl radical, hexyl radicals, such as the n-hexyl radical, heptyl radicals, such as the n-heptyl radical, octyl radicals, such as the n-octyl radical and isooctyl radicals, such as the 2,2,4-trimethylpentyl radical, nonyl radicals, such as the n-nonyl radicals, decyl radicals, such as the n-decyl radical, dodecyl radicals, such as the n-dodecyl radical, and octadecyl radicals, such as the n-octadecyl radical; alkenyl radicals such as the vinyl and ally radical; cycloalkyl radicals, such as the cyclopentyl, cyclohexyl, cycloheptyl and methylcyclohexyl radicals; aryl radicals, such as the phenyl, naphthyl, anthryl and phenanthryl radical; alkaryl radicals, such as the o-, m- and p-tolyl radicals, xylyl radicals and ethylphenyl radicals; and aralkyl radicals such as the benzyl radical and the phenylethyl radical or caprylyl radical. Most preferred R is the methyl radical and R' is preferably from C$_3$-C$_{20}$ and is preferably but not restricted to, n-propyl, n-octyl, iso-octyl radical.

The silanes of the formula (I) which are used according to the invention are commercially available products or can be prepared by customary methods in silicon chemistry, for example by processes as described in Noll, Chemie and Technologie der Silikone [Chemistry and Technology of the Silicones], 2nd edition 1968, Weinheim, and in Houben-Weyl, Methoden der organischen Chemie [Methods of Organic Chemistry], Volume E20, Georg Thieme Verlag, Stuttgart (1987).

In another embodiment of the invention the non-ionic emulsifier is selected from polyoxyalkylene alkyl ether, polyoxyalkylene alkylphenyl ethers and polyoxyalkylene sorbitan esters. Some useful emulsifiers having HLB value in between 8 and 20 are polyethylene glycol octyl ether; polyethylene glycol lauryl ether; polyethylene glycol tridecyl ether; polyethylene glycol cetyl ether; polyethylene glycol stearyl ether; polyethylene glycol nonylphenyl ether; polyethylene glycol dodecylphenyl ether; polyethylene glycol cetylphenyl ether; polyethylene glycol stearylphenyl ether; polyethylene glycol sorbitan mono stearate and polyethylene glycol sorbitan mono oleate.

Non-ionic emulsifier having HLB value between 8 to 20 and preferably, in one embodiment at least one emulsifier or a mixture of emulsifier having an HLB value from 10-16 has a great importance in the present invention to make process simpler. In another embodiment the emulsifier is most preferably a mixture of nonionic emulsifiers.

In another embodiment a cationic or anionic emulsifiers may be selected as an emulsifier.

HLB values are typically referred to the values at room temperature (25° C.). As temperature varies, the HLB value of a surfactant/emulsifier may also vary. Calculation of HLB value of non-ionic surfactants/emulsifiers is calculated according to the equations: HLB=(E+P)/5; E=weight percentage of oxyethylene content; P=weight percentage of polyhydric alcohol content (glycerol, sorbitol, etc.) provided according to the terms of the HLB system of emulsifier classification introduced by Griffin, W. C., "Calculation of HLB Values of non-ionic Surfactants", Journal of COSMETIC SCIENCE, Vol. 5, No. 4, January 1954, 249-256 (1954).

For ionic surfactants/emulsifiers, the HLB value of individual surfactant/emulsifier molecules can be calculated applying the Davies formula as described in Davies JT (1957), "A quantitative kinetic theory of emulsion type, I. Physical chemistry of the emulsifying agent", Gas/Liquid and Liquid/Liquid Interface (Proceedings of the International Congress of Surface Activity): 426-38.

Emulsifiers mixture having HLB value in between 10-16 are suitable to make the emulsion process simpler. When two emulsifiers A and B of known HLB are thus blended for use the HLB$_{Mix}$ is said to be the required HLB for the mixture. This is expressed by the equation (W$_A$HLB$_A$+W$_B$HLB$_B$)/(W$_A$+W$_B$)=HLB$_{Mix}$, where W$_A$=the amount (weight) of the first emulsifier (A) used, and $W_B$=the amount (weight) of the second emulsifier (B); $HLB_A$, $HLB_B$=the assigned HLB values for emulsifiers A and B; $HLB_{Mix}$=the HLB of the mixture.

The self-dispersible mixture additive composition is finally dispersed in aprotic solvent preferably an aqueous solvent. The aqueous solvent is preferably water.

The composition according to the invention is an oil-in-water emulsion. In an emulsion, one liquid (the dispersed phase) is dispersed in the other (the continuous phase). According to the inventive oil-in-water emulsion the silicone mixture (the dispersed phase) is dispersed in the continuous water phase. The emulsion may be a micro emulsion or a macro emulsion.

For improving the performance characteristics, further additives can be added to the self-dispersible mixture additive. Further constituents of the self-dispersible mixture additive which are present in preferred embodiments are, for example, pigments, fillers, such as, for example, silicas or zeolites, foam stabilizers, water repellants or air-entraining agents.

The self-dispersible mixture additive composition is preferably used in construction chemistry products, if appropriate in combination with hydraulically setting binders, such as cements (Portland, high-alumina, trass, slag, magnesia or phosphate cement), gypsum and waterglass, for the production of construction adhesives, in particular tile adhesives, and composite thermal insulation adhesives, renders, filling compounds, such as, for example, floor filling compounds, leveling compounds, slurry-type seal coats, joint mortars and paints. Further applications are pneumatically applied mortar and air-placed concrete for structures of building construction and civil engineering and the lining of tunnel walls.

The following examples serve for the detailed illustration of the invention and should in no way be understood as being limiting.

EXAMPLES

I. Cement Additive Application
Self-dispersible mixture additive composition (additive):
n-octyltrimethoxysilane (n-OTMS): 60 g
SA-6 (Stearyl Alcohol 6EO): 8.3 g
Lutensol TO5: 1.3 g
Poloxamer 407 (Pluronic F127): 2.0 g
Butyl carbitol (Diethyleneglycol monobutyl ether): 14.2 g
Laffsolve (Ethyleneglycon mono n-propylether): 14.2 g
HLB of the emulsifier system=ΣW*HLB/ΣW=(8.3*10.3+ 1.3*10+2*18+14.2*15+14.2*12)/40=12.96
Emulsion Preparation:
  n-octyltrimethoxysilane emulsion is prepared in-situ using the additive
Additive: 15 g
DI Water: 45 g
  PORTLAND cement (Portland cement, Class C) is used as base cement. It is treated with the emulsion in-situ prepared.
Preparation of Hydrophobic Cement:
  Take 300 g Portland cement and blend with 2.5 g emulsion (15% active) in a mixture grinder at low speed for 1 min. Active silane concentration 0.125% by wt with respect to dry cement.
Preparation of Dry Cement Block:
  Put the dry cement powder in a mold and press with hydraulic press for compaction Beading Time Test:
  Put water drop on the smooth surface (size 0.1 g±0.01) and record the time when it disappears.
Selection of Silane for the Experiments:
  n-Propyltrimethoxysilane and n-Octyltrimethoxysilane are selectively chosen for the performance test but it may not restrict the silane for the current invention.
Tests According to the Inventive Aspect:
  A) Dosing of silane: PORTLAND cement (Portland cement, Class C) is used as base cement. It is treated with the emulsion in-situ prepared having the % dosing of silane in the cement mixture. The dry cement block is prepared and beading time test is done to record the time to disappear of water droplet in Table 1. The beading time vary with the variation of silane dosing as described in Table 1.

TABLE 1

Beading Time Vs Activesilane concentration:

| Silane | Dosing | (%) Time to disappear water droplet (absorbed in cement) |
|---|---|---|
| n-Propyltrimethoxysilane | 0.5% | Overnight |
| n-Octyltrimethoxysilane | 0.5% | Overnight |
| n-Propyltrimethoxysilane | 0.25% | 930 min |
| n-Octyltrimethoxysilane | 0.125% | 190 min |

B) Ageing test of treated cement: (Portland cement, Class C) is used as base cement. It is treated with the emulsion in-situ prepared having the % dosing of silane in the cement mixture. Treated cement is kept in a closed glass bottle and aged at 50° C. oven as per the ageing time in table 2. The dry cement block is prepared with the aged cement and beading time test is done to record the time to disappear of water droplet in Table 2. We note that when the cement is treated with the emulsion in-situ prepared the beading time do not reduces thus indicating that the treated cement with the emulsion in-situ prepared retains the hydrophobicity property and do not deteriorate over time.

TABLE 2

Beading Time Vs Ageing of the treated cement:

| Silane | Dosing (%) | Aging Time | Time to disappear water droplet (absorbed in cement) |
|---|---|---|---|
| Octyltrimethoxysilane | 0.125% | Freshly Prepared | 190 min |
| Octyltrimethoxysilane | 0.125% | 3 wks | 165 min |
| Octyltrimethoxysilane | 0.125% | 6 wks | 195 min |

*Aging: Treated cement is kept in a closed glass bottle and aged at 50° C. oven

C) Ageing test of emulsion: The emulsion is prepared of the self-dispersible mixture additive composition of octyltrimethoxysilane as in Table 3. Emulsion treated in a closed glass bottle and aged at 50° C. oven for the following ageing time as per Table 3. Portland cement, Class C is used as base cement. It is treated with the aged emulsion having the % dosing of silane in the cement mixture. The dry cement block is prepared with the treated cement with the aged emulsion and beading time test is done to record the time to disappear of water droplet in Table 3. We note that there is a drastic reduction in beading time for the aged emulsion as in Table 3.

TABLE 3

Beading Time Vs Aged emulsion:

| Silane | Dosing (%) | Aging Time | Time to disappear water droplet (absorbed in cement) |
|---|---|---|---|
| n-Octyltrimethoxysilane | 0.125% | Freshly Prepared | 190 min |
| n-Octyltrimethoxysilane | 0.125% | 3 days | 180 min |
| n-Octyltrimethoxysilane | 0.125% | 10 Days | <1 min |

*Aging: Emulsion treated in a closed glass bottle and aged at 50° C. oven

D) Comparative Test: In Table 4, we note that the inventive emulsion prepared in-situ by self-dispersible mixture additive composition performs much superior with respect to beading time than the blank Portland cement and the Portland cement treated with the emulsion previously prepared with Octyltrimethoxysilane (Competitive product).

TABLE 4

Beading Time Vs Customer product:

| Silane | Dosing (%) | Aging Time | Time to disappear water droplet (absorbed in cement) |
|---|---|---|---|
| n-Octyltrimethoxysilane + Blank PORTLAND cement | 0.125% | Freshly Prepared | 190 min |
| Portland Cement | | | <1 min |
| Competitive product | | | <1 min |

E) Performance Test

The comparative performance test is performed for the Mortar prepared by inventive emulsion prepared in-situ by self-dispersible mixture additive composition, the blank Portland cement and the market product (Competitive product).

Mortar Testing:
Composition: Sand—1200 g; Cement—400 g; Water—240 g

Preparation of Test Specimens

Materials for the control mix and test mix, and molds for the test specimens, shall be conditioned for at least 24 h before use. Conditioning shall be by placing in an enclosure maintained at (20±2) ° C. and (65±5) % relative humidity.

Mixing of the mortar shall be as described in EN 480-1. Mortar specimens (40×40×160) mm shall be prepared as described in EN 196-1, except that the molds shall not be oiled.

When testing at equal w/c ratio, the water content of the admixture shall be taken into account when calculating the required water content of the mortar.

In case the test mix shall have the same consistence as the control mix this shall be measured by using the workability meter in accordance with EN 413-2.

The following equipment is considered for performing the test Tonimix mixture, Germany (Zwick Rolle)

| Equipment | Testing for | Make |
|---|---|---|
| ToniMIX | Mortar Mixing | Toni Technik |
| Flow Table | Slump | Toni Technik |
| Mould | Prism making | Toni Technik |
| ToniVIB | Mould Compaction | Toni Technik |
| ToniPRAX | Compressive & Flexural Test | Toni Technik |
| VICAT Needle | Setting | |

Following timings are considered: Dry Mix: 30 sec; Wet Mix at Low: 30 Sec; Idle (Scrap): 90 Sec; Wet Mix at High: 90 Sec.

TABLE 5

Mortar Test Results:

| Testing | PORTLAND Cement | Competitive product | 0.125% n-OTMS |
|---|---|---|---|
| Slump Test (cm) | 12.5 | 13.7 | 14.5 |
| Primary Setting Time (min) | 30.75 | 61.25 | 30.75 |
| Final Setting Time (min) | 183.25 | 198.5 | 183.25 |

TABLE 6

Compressive/ Flexural Strength Results

| Testing | PORTLAND Cement | Competitive product | 0.125% n-OTMS |
|---|---|---|---|
| Compressive Strength (After 14 days) (N/mm2) | 6.71 | 9.88 | 14.37 |
| Compressive Strength (After 28 days) (N/mm2) | 14.16 | 16.99 | 16.02 |
| Flexural Strength (After 14 days) (N/mm2) | 2.95 | 3.76 | 3.28 |
| Flexural Strength (After 28 days) | 3.09 | 3.24 | 3.62 |

TABLE 7

Beading effect on set concrete (mortar = cement + sand)

| CEMENT TYPE | Beading time (min) |
|---|---|
| PORTLAND Cement | 0 |
| Competitive product | 0 |
| n-OTMS + Blank PORTLAND cement | >120 |

II. Fiber Cement Board Application (A) Premix Composition:

| | |
|---|---|
| n-octyltrimethoxy silane | 85.56% |

SA 6 (Stearyl Alcohol 6EO): 6.84%

| | |
|---|---|
| Softanol 90 Nippon | 1.08% |
| Lutensol TO5 BASF | 4% |
| Phenoxy ethanol | 2.50% |

(B) Self-Dispersible Mixture Additive Composition:

| | |
|---|---|
| Premix | 98% |
| dibutyl tin dilaurate catalyst | 2% |

Procedure:

1. 50 g of self-dispersible mixture additive composition is taken in a 1 L beaker and add 415 g of water slowly added under stirring (manual mixing)

2. A milky white emulsion results
3. The specimen (¼" Corrugated Cement Fibre Board and ½" Flat Cement Fibre Board) is wiped with paint brush
4. Wet to wet coat is applied as per standard procedure
5. The specimen is cured at 50° C. and 50% RH for 14 days and the water uptake test is performed.

TABLE 8

Test for water uptake in case of corrugated cement fiber board:

|  | % Water uptake | Beading Effect |
|---|---|---|
| Blank | 14.76% | 4-5 |
| Treated with self-dispersible mixture additive composition | 7.22% | 1-2 |

TABLE 9

Test for water uptake in case of flat cement fiber board:

|  | % Water uptake | Beading Effect |
|---|---|---|
| Blank | 19.01% | 4-5 |
| Treated with self-dispersible mixture additive composition | 8.90% | 1-2 |

Beading Effect Rating:
1=excellent, 2=good, 3=slightly wetting, 4=strongly wetting, 5=completely wetting III. Hydrolysed n-Octyltriethoxysilane Preparation:
n-Octyltriethoxysilane: 3300 g
Conc H2SO4: 7.2 g
Water: 108 g
is taken in a reactor and temperature at 85° C. reflux and finally distilled out all volatiles (Yield: 92%) and then neutralize by Triethanolamine to get the hydrolyzed n-Octyltriethoxysilane. The hydrolyzed n-Octyltriethoxysilane is having greater than one unit.

Self-Dispersible Mixture Composition
The following components are mixed together in weight percent to form the self-dispersible mixture additive composition:
Hydrolyzed n-octyltriethoxysilane: 85.56%
SA6 (Stearyl Alcohol 6EO): 6.84%
Softanol 90 Nippon: 1.08%
Lutensol TO5 BASF: 4.00%
Phenoxy ethanol: 2.5%
HLB of the emulsifier system=ΣW*HLB/ΣW=(6.84*10.3+1.08*13.3+4*10)/11.92=10.47

Emulsion Preparation:
Hydrolyzed n-octyltriethoxysilane emulsion is prepared in-situ using the additive composition and deionized water (DI) in the following weight:
Additive: 15 g
DI Water: 45 g
PORTLAND cement (Portland cement, Class C) is used as base cement. It is treated with the emulsion in-situ prepared.

Preparation of Hydrophobic Cement:
Take 300 g Portland cement and blend with 2.5 g emulsion (15% active) in a mixture grinder at low speed for 1 min. Active silane concentration 0.125% by wt with respect to dry cement.

Preparation of Dry Cement Block:
Put the dry cement powder in a mold and press with hydraulic press for compaction Beading Time Test:
Put water drop on the smooth surface (size 0.1 g±0.01) and record the time when it disappears.

Selection of Silane for the Experiments:
Hydrolyzed n-octyltriethoxysilane is selectively chosen for the performance test but it may not restrict the silane for the current invention.

Comparative Test:
In Table 10, we note that the inventive emulsion prepared in-situ by self-dispersible mixture additive composition performs much superior with respect to beading time than the blank Portland cement and the Portland cement treated with the emulsion previously prepared with Octyltrimethoxysilane (Competitive product).

TABLE 10

Beading Time Vs Customer product:

| Silane | Dosing (%) | Aging Time | Time to disappear water droplet (absorbed in cement) |
|---|---|---|---|
| Hydrolyzed n-octyltriethoxysilane + Blank PORTLAND cement | 0.125% | Freshly Prepared | 210 min |
| Portland Cement |  |  | <1 min |
| Competitive product |  |  | <1 min |

Weight Loss Test for the Hydrolyzed Silane (Inventive Aspect):
Cement mill temperature is around 110° C. But hydrolyzed silanes are dimer or more and non-volatile at this temperature. So, weight loss test is carried out at 110° C. at Halogen Moisture Analyzer (till constant weight)
A) Hydrolysed n-Octyltrimethoxysilane Premix
Percent dry content at 110° C.=32.43%
B) Hydrolysed n-Octyltriethoxysilane Premix
Percent dry content at 110° C.=90.54%.

It is thus observed that the composition containing the inventive self-dispersible mixture additive composition decreases the water uptake percentage of the substrate and improves the beading effect thus improving the hydrophobicity.

The invention claimed is:
1. A composition comprising:
a self-dispersible mixture additive composition comprising:
50 to 90 weight percent, based on the total weight of the composition, of a hydrolysate of alkylalkoxysilane

$$\text{i. } (RO)_{4-n}SiR'_n \tag{I}$$

where, n is any number from 1 to 3,
R is same or different and is a $C_1$-$C_{20}$ group,
R' is same or different and is a $C_1$-$C_{20}$ group; and
50 to 10 weight percent, based on the total weight of the composition, of one or more non-ionic emulsifiers having an HLB value between 8 and 20, wherein, the one or more non-ionic emulsifiers are selected from polyoxyalkylene alkyl ether, polyoxyalkylene alkyl phenyl ethers and polyoxyalkylene sorbitan esters.
2. The composition as claimed in claim 1, wherein the R' is same or different $C_3$-$C_{20}$ group.

3. The composition as claimed in claim 1, wherein the R' is selected from propyl, butyl, pentyl, hexyl, heptyl and octyl radical and its isomers or mixtures thereof.

4. The composition as claimed in claim 1, wherein the alkyltrialkoxysilane is selected from propyltrimethoxy silane, propyltriethoxy silane, octyltrimethoxy silane, octyltriethoxy silane, isooctyltrimethoxy silane, isooctyltriethoxy silane or its isomers or mixtures thereof.

5. The composition as claimed in claim 1, further comprising a catalyst.

6. An emulsion comprising the composition of claim 1 and a protic solvent.

7. A powder composition comprising the composition of claim 1.

8. A liquid composition comprising the composition of claim 1.

9. A process of preparing a self-dispersible mixture additive composition of claim 1, comprising combining (A) 50 to 90 weight percent, based on the total weight of the composition, of a hydrolysate of alkylalkoxysilane i. $(RO)_{4-n}SiR'_n$        (I)

where, n is any number from 1 to 3,
R is same or different and is a $C_1$-$C_{20}$ group,
R' is same or different and is a $C_1$-$C_2$ group; and
(B) 50 to 10 weight percent, based on the total weight of the composition, of one or more non-ionic emulsifiers having an HLB value between 8 and 20, wherein, the one or more non-ionic emulsifiers are selected from polyoxyalkylene alkyl ether, polyoxyalkylene alkyl phenyl ethers and polyoxyalkylene sorbitan esters.

* * * * *